United States Patent
Schmid

(10) Patent No.: US 12,332,900 B2
(45) Date of Patent: *Jun. 17, 2025

(54) RESOLVING UNKNOWN DATA NODES DURING GRANULAR QUERY PROCESSING VIA A PLANAR DATA MODEL

(71) Applicant: Vaayu Tech GmbH, Berlin (DE)

(72) Inventor: Luca Nils Schmid, Berlin (DE)

(73) Assignee: Vaayu Tech GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/829,155

(22) Filed: Sep. 9, 2024

(65) Prior Publication Data

US 2024/0427774 A1    Dec. 26, 2024

Related U.S. Application Data

(63) Continuation of application No. 18/761,138, filed on Jul. 1, 2024, which is a continuation of application No. PCT/EP2023/072749, filed on Aug. 17, 2023.

(60) Provisional application No. 63/398,734, filed on Aug. 17, 2022.

(51) Int. Cl.
| | |
|---|---|
| *G06F 16/00* | (2019.01) |
| *G06F 16/22* | (2019.01) |
| *G06F 16/2455* | (2019.01) |
| *G06F 16/248* | (2019.01) |

(52) U.S. Cl.
CPC .... *G06F 16/24556* (2019.01); *G06F 16/2246* (2019.01); *G06F 16/24565* (2019.01); *G06F 16/248* (2019.01)

(58) Field of Classification Search
CPC ........... G06F 16/24556; G06F 16/2246; G06F 16/24565; G06F 16/248
USPC .................................................. 707/600–899
See application file for complete search history.

(56) References Cited

U.S. PATENT DOCUMENTS

| | | | | |
|---|---|---|---|---|
| 2009/0024563 | A1* | 1/2009 | Sengar | G06F 11/3409 |
| 2012/0101975 | A1* | 4/2012 | Khosravy | G06Q 30/0201 |
| | | | | 706/55 |
| 2019/0384461 | A1* | 12/2019 | Seif | G06F 3/0484 |
| 2022/0156240 | A1* | 5/2022 | Smith | G06F 16/2358 |

(Continued)

OTHER PUBLICATIONS

International Search Report and Written Opinion, PCT/EP2023/072749, European Patent Office, dated Nov. 3, 2023, 13 pages.

(Continued)

*Primary Examiner* — Michelle N Owyang
(74) *Attorney, Agent, or Firm* — Squire Patton Boggs LLP; Chia-Hsin Suen

(57) ABSTRACT

A technique for processing a query of a life cycle assessment database includes searching one or more hierarchical structures included in the life cycle assessment database for a first set of data nodes that match a first set of parameters included in the query, where the first set of parameters comprises a set of primary data associated with an entity. The technique also includes computing a first set of emissions associated with the first set of data nodes based on a first set of functional units included in the first set of data nodes. The technique further includes aggregating the first set of emissions into a result of the query and causing the result to be outputted in a response to the query.

20 Claims, 6 Drawing Sheets

(56) References Cited

U.S. PATENT DOCUMENTS

| | | | |
|---|---|---|---|
| 2023/0139783 A1* | 5/2023 | Garib | G06N 3/044 707/769 |
| 2024/0078215 A1* | 3/2024 | Chatterjee | G06N 20/00 |
| 2024/0184793 A1* | 6/2024 | Amulu | G06F 16/2465 |

OTHER PUBLICATIONS

Elmasri et al., "Fundamentals of Database Systems, 7th Edition", Jun. 8, 2015, 397 pages.

Fritter et al., "A survey of Life Cycle Inventory database implementations and architectures, and recommendations for new database initiatives", The International Journal of Life Cycle Assessment, Springer-Verlag GmbH Germany, Jun. 23, 2020, 10 pages, https://doi.org/10.1007/s11367-020-01745-5.

Wikipedia, "Life-cycle assessment", Aug. 13, 2023, 27 pages, https://en.wikipedia.org/wiki/Life-cycle_assessment.

\* cited by examiner

RESOLVING UNKNOWN DATA NODES DURING GRANULAR QUERY PROCESSING VIA A PLANAR DATA MODEL

CROSS-REFERENCE TO RELATED APPLICATIONS

This application is a continuation of the co-pending U.S. patent application titled, "GRANULAR QUERY PROCESSING VIA A PLANAR DATA MODEL", filed on Jul. 1, 2024, and having Ser. No. 18/761,138, which is a continuation of the co-pending International patent application titled, "GRANULAR QUERY PROCESSING VIA A PLANAR DATA MODEL" filed on Aug. 17, 2023, and having Ser. No. PCT/EP2023/072749, which claims the priority benefit of U.S. provisional application titled "LIFE CYCLE ASSESSMENT SYSTEM UTILIZING A PLANAR DATA ARCHITECTURE," filed on Aug. 17, 2022, and having Ser. No. 63/398,734. The subject matter of these related applications is hereby incorporated herein by reference.

BACKGROUND

Field of the Various Embodiments

Embodiments of the present disclosure relate generally to databases and query processing and, more specifically, to granular query processing via a planar data model.

Description of the Related Art

Life Cycle Assessment (LCA) is a framework for assessing the environmental impacts of a product, service, process, organization, and/or another entity across the life cycle of the entity. For example, LCA can be used to estimate pollutant emissions, water use, land use change, toxicity, depletion of resources, acidification, ozone layer depletion, climate change impacts, and/or other types of environmental impacts associated with raw material extraction and processing, energy creation, energy expenditure, transportation, marketing or advertising, usage and retail, travel, and/or end-of-life disposal for the entity. The results of an LCA can then be used to improve product development and research, supply chain management and procurement, strategic management, and/or other types of decisions and actions related to the entity.

An LCA study is typically conducted by an LCA specialist using specialized LCA software tools and LCA databases that house environmental data related to various processes and materials. The LCA specialist typically follows a systematic and standardized sequence of steps, beginning with a "goal and scope definition" step that establishes the purpose, breadth, depth, and boundaries of the LCA study. Next, the LCA specialist performs a "life cycle inventory" step that involves collecting data related to inputs (e.g., raw materials and energy) and outputs (e.g., emissions and waste) across the life cycle of the entity in question. This data forms the crux of the assessment and is often gathered from various sources, including direct measurements, literature, and the LCA databases. Subsequently, the LCA specialist uses the LCA tools to perform a "life cycle impact assessment" step that aggregates and/or transforms the data into the environmental impacts. Finally, the LCA specialist engages in an "interpretation" step that involves evaluating and verifying the results, drawing conclusions, and providing recommendations for improving the environmental impacts.

However, current LCA tools and databases tend to lack granularity and specificity, which can negatively impact the accuracy of the results. For example, inaccurate and/or incomplete data from an LCA database could cause an LCA tool to compute inaccurate emissions for a given entity. These inaccurate emissions could prevent the LCA tool from identifying "hotspots" within the life cycle of the entity that contribute more to emissions, energy consumption, and/or other environmental impacts. The LCA studies could also, or instead, inaccurately identify portions of the life cycle as hotspots when these portions do not contribute significantly to the environmental impacts of the entity. In another example, inaccurate and/or incomplete data could cause an LCA tool to generate results indicating that a first process has a lower environmental impact than a second process, when the first process has a higher environmental impact than the second process. Decisions or actions that rely on these results could prioritize use of the first process over use of the second process, thereby causing an unintended increase in environmental impacts.

Newer LCA tools provide user interfaces that allow non-specialized users to conduct LCA studies by inputting data and/or measurements related to different stages in the life cycles of various types of entities. However, these LCA tools operate using predefined rigid workflows and require certain data points to be provided before the requisite environmental impacts can be assessed and evaluated. Consequently, these LCA tools can lack the ability to perform LCA for life cycles that are represented using varying amounts, types, and/or granularities of data.

As the foregoing illustrates, what is needed in the art are more effective techniques for performing LCA.

SUMMARY

One embodiment of the present invention sets forth a technique for processing a query of a life cycle assessment database. The technique includes searching one or more hierarchical structures included in the life cycle assessment database for a first set of data nodes that match a first set of parameters included in the query, where the first set of parameters comprises a set of primary data associated with an entity. The technique also includes computing a first set of emissions associated with the first set of data nodes based on a first set of functional units included in the first set of data nodes. The technique further includes aggregating the first set of emissions into a result of the query and causing the result to be outputted in a response to the query.

One technical advantage of the disclosed techniques relative to the prior art is the ability to determine environmental impacts associated with the life cycle of an entity without requiring specific inputs, outputs, and/or measurements across the life cycle of the entity to be provided. Consequently, the disclosed techniques can be used to define and execute LCA queries with greater granularity, flexibility, and efficiency than conventional LCA tools that operate using predefined workflows and require certain data points to be specified. Another technical advantage of the disclosed techniques is the ability to automate LCA by processing queries using searches, similarity comparisons, aggregations, and/or computations that leverage a database with a planar data model. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
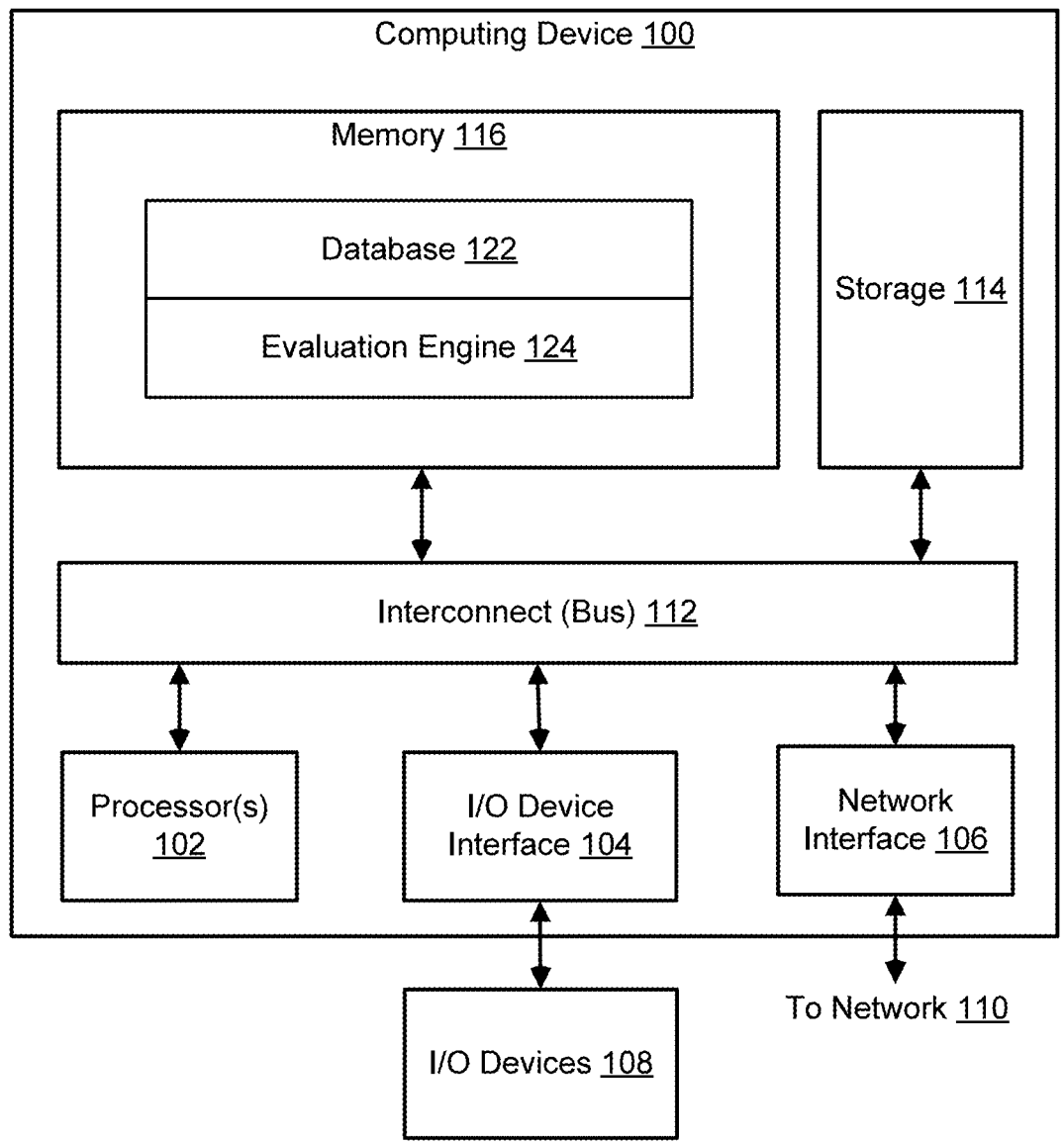
FIG. 1 illustrates a computing device configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a database 122 and an evaluation engine 124 that reside in a memory 116.

It is noted that the computing device described herein is illustrative and that any other technically feasible configurations fall within the scope of the present disclosure. For example, multiple instances of database 122 and evaluation engine 124 could execute on a set of nodes in a distributed and/or cloud computing system to implement the functionality of computing device 100. In another example, database 122 and evaluation engine 124 could execute on various sets of hardware, types of devices, or environments to adapt database 122 and/or evaluation engine 124 to different use cases or applications. In a third example, database 122 and evaluation engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Database 122 and evaluation engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including database 122 and evaluation engine 124.

In some embodiments, database 122 stores life cycle assessment (LCA) data using a planar data model that includes multiple interconnected planes. The planar data model includes a data plane that stores data nodes representing products, processes, emissions, consumptions, and/or other entities that are used to perform LCA. The data nodes can be organized within trees and/or other hierarchical data structures to represent dependencies and/or relationships between or among the corresponding entities. The planar data model also includes a separate ontological plane that stores metadata associated with data nodes in the data plane. This metadata includes (but is not limited to) sources, timeframes, locations, classes, and/or attributes associated with data in the data nodes. The ontological plane and data plane are interconnected to allow emissions, consumptions, productions, and/or other quantities associated with the entities to be aggregated, related to one another, compared, and/or otherwise used to evaluate environmental impacts associated with the entities.

Evaluation engine 124 includes functionality to perform LCA by evaluating queries against database 122. Each query can be used to analyze the environmental impact of a product, process, service, organization, and/or another entity. To process a query, evaluation engine 124 uses metadata stored in the ontological plane to match parameters of the query to data nodes in the data plane. Evaluation engine 124 then computes emissions, consumptions, productions, waste products, and/or other types of impact data associated with the entity by traversing paths associated with the matching data nodes in the data plane and aggregating, scaling, and/or otherwise transforming functional units stored in the matching data nodes. The operation of database 122 and evaluation engine 124 is described in further detail below.

Granular Query Processing Via a Planar Data Model

Figure 2:
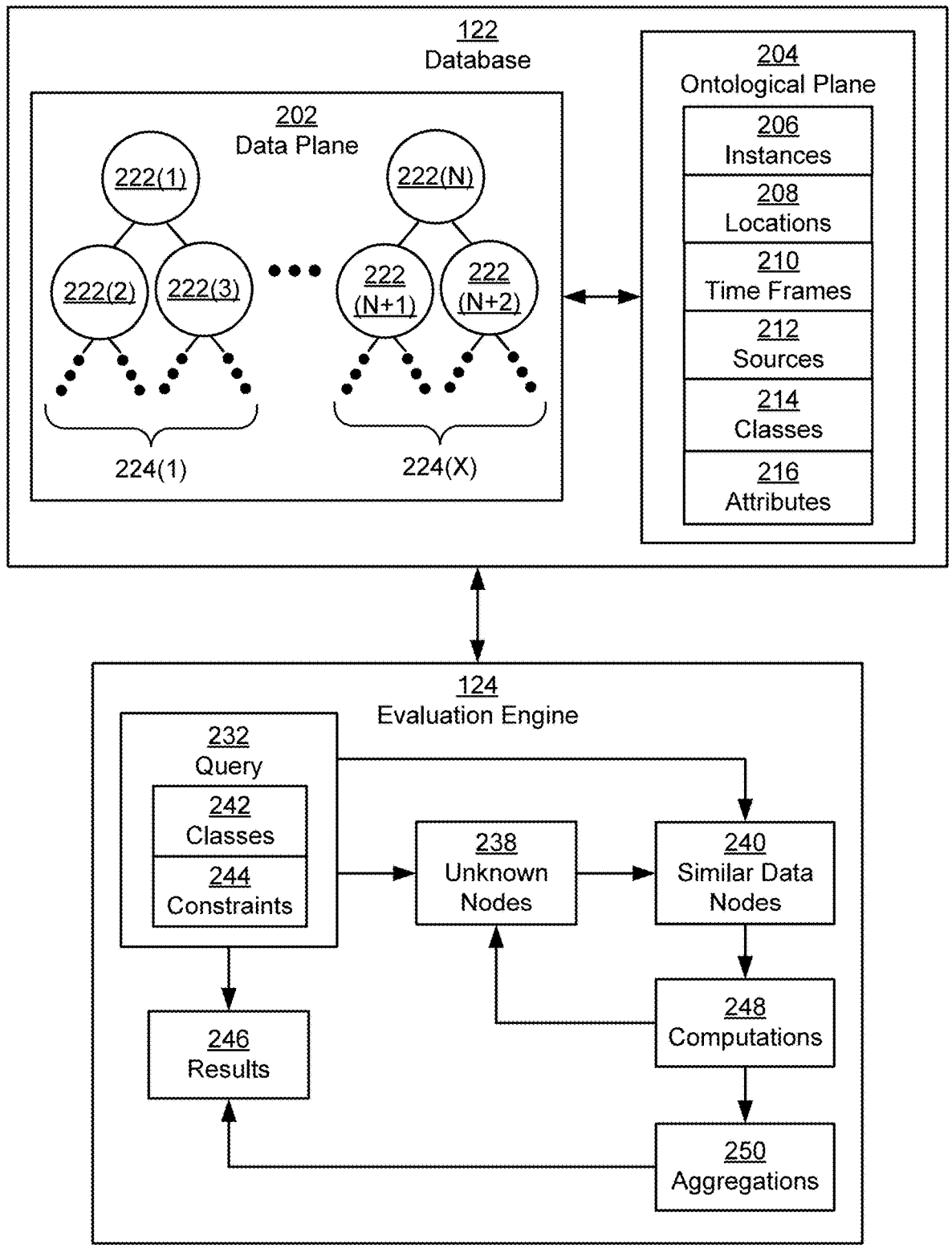
FIG. 2 is a more detailed illustration of the database and evaluation engine of FIG. 1, according to various embodiments.

FIG. 2 is a more detailed illustration of database 122 and evaluation engine 124 of FIG. 1, according to various embodiments. As mentioned above, database 122 includes a data plane 202 and an ontological plane 204. Data plane 204 stores LCA data points in data nodes 222(1)-222(3) and 222(N)-222(N+2) (each of which is referred to individually herein as data node 222) that are hierarchically organized within a number of trees 224(1)-224(X) (each of which is referred to individually herein as tree 224).

Within data plane 202, data nodes 222 store data that can be used to perform LCA. For example, each tree 224 of data nodes 222 within data plane 202 could store data from a different dataset of secondary LCA data. Each dataset could be obtained from a separate source, such as (but not limited to) an LCA paper, an LCA database, a database of energy grid mixes, an LCA study, and/or a survey.

One type of data node 222 represents a consumable that does not have direct emissions or products, such as (but not limited to) a product, a byproduct of a process, and/or an item or material utilized in the production of a product. Another type of data node 222 represents a process that includes a series of steps for achieving a certain outcome, such as (but not limited to) producing a physical item, machine, textile, good, food, beverage, pharmaceutical product, ingredient, service, and/or experience.

Within trees 224, data nodes 222 representing processes can be connected to other data nodes 222 via edges representing various types of relationships. An edge from a first data node 222 to a second data node 222 can denote a consumption relationship, in which the first data node 222 requires a quantity of the second data node 222. Because the consumption relationship represents a dependency of the first data node 222 on the second data node 222, the consumption relationship can be used to infer the effect of a change in one data node 222 on the other data node 222. For example, a shortage in a product, material, and/or another consumable represented by the second data node 222 could result in a decrease in a different product produced by the process represented by the first data node 222. In another example, an increase in the demand for the product produced by the process represented by the first data node 222 could lead to an increase in consumption of the consumable represented by the second data node 222.

An edge from a first data node 222 to a second data node 222 within a given tree 224 can alternatively denote a production relationship, in which the first data node 222 produces a quantity of the second data node 222. For example, a production relationship between a process represented by the first data node 222 and a product represented by the second data node 222 could indicate that the product is produced by the process.

A given data node 222 representing a process additionally includes one or more emission relationships that represent emissions of the process. Each emission relationship can be represented as an edge from that data node 222 to a different data node 222 and/or another element in data plane 202 that represents a gas and/or another type of emission.

An example tree 224 of data nodes 222 in data plane 202 includes the following:
cotton cultivation-[:CONSUMES]→cotton seeds←[:PRODUCES]-cotton gin-[:CONSUMES]→cotton-[:CONSUMES]→cotton cultivation In the above example, a first data node 222 representing a "cotton cultivation" process has a consumption relationship with a second data node 222 representing a "cotton seeds" consumable. A third data node 222 representing a "cotton gin" process has a production relationship with the second data node 222 and a consumption relationship with a fourth data node 222 representing a "cotton" consumable. The fourth data node 222 additionally has a consumption relationship with the first data node 222 representing the "cotton cultivation" process. The "cotton cultivation" and "cotton gin" processes represented by the first data node 222 and third data node 222, respectively, can also include emission relationships (not shown) that represent emissions of various gases and/or byproducts.

In some embodiments, data nodes 222 and/or relationships in data plane 202 are associated with functional units that can be used to quantify, characterize, and/or compare the corresponding processes, consumptions, productions, and/or emissions. Each functional unit includes a unit and a numeric value representing a quantity of that unit. For example, a functional unit for the emission of a vehicle could be defined as 1 kilometer driven.

Each type of functional unit can also be associated with a reference unit that is used to normalize and/or standardize across different functional units of that type. For example, a reference unit for distance could be set to meters, so that a consumption that is specified in another unit for distance (e.g., kilometers, centimeters, feet, miles, etc.) would be converted into meters. Further, a mathematical operation involving two functional units that do not have the same reference unit could return an error and/or fail.

Within data plane 202, functional units can be represented using various types of probability distributions. One type of probability distribution can include a triangular distribution with a minimum value, a maximum value, and a peak (i.e., most likely) value. Another type of probability distribution can include a rectangular or uniform distribution, in which all values within a range between a minimum value and a maximum value have equal probability. Additional types of probability distributions can include (but are not limited to) Normal distributions, Log-normal distributions, Binomial distributions, Poisson distributions, exponential distributions, and/or other types of distributions that can be used to represent different types of LCA functional units. This distribution-based representation of functional units allows the corresponding emissions, consumptions, productions, and/or data nodes 222 to be described with a quantitative uncertainty, which in turn can be used to determine the source of uncertainty and/or techniques for decreasing uncertainty within a given LCA and/or model.

A given data node 222 and/or relationship can additionally be associated with a multi-dimensional functional unit that includes multiple dimensions. For example, a delivery that is characterized using a mass, volume, and distance could be represented by a one-dimensional functional unit such as a ton-kilometer. While this one-dimensional representation can be used to model environmental impacts for a linear system, the same representation would fail to yield accurate results for a non-linear system. Instead, the delivery could be represented using a single data node 222 with a multi-dimensional functional unit of (1 kg, 0.5 L, 3 MJ) and a certain emissions value.

One or more functional units can additionally be defined as a non-standard, or "custom" unit. For example, a custom unit for washing machine usage could include "rounds per minute," "washing temperature," and "number of washes." In another example, a custom unit for the dimensions of a box could include a width, height, and depth that are each defined using centimeters. This custom unit could then be used to normalize a functional unit for a given data node 222 that is specified in centimeters with a consumption that is specified in meters.

A given data node 222 and/or relationship can be associated with a "probability" functional unit that specifies an explicit probability of a certain outcome. For example, a process for producing semiconductor wafers could include a 20% probability of producing a faulty wafer. In another example, a functional unit for a clothes washing process could include a 60% probability that an electrical dryer is used in the process. This probability is applied to a result (e.g., an emissions calculation) of a given LCA evaluation instead of being combined with other functional units used to generate the result.

In one or more embodiments, a consumption relationship is associated with a transform function that receives a first functional unit as input and generates a second functional unit as output. The transform function can be used to specify a nonlinear consumption relationship. For example, a transform function could model a nonlinear relationship between the distance traveled by an air cargo flight and the amount of fuel consumed by the flight by computing a higher fuel consumption per unit distance during takeoff and climb and a lower fuel consumption per unit distance during cruising.

A consumption relationship can also, or instead, specify an "unknown" consumption that lacks concrete data. For example, a process represented by a first data node 222 could have a consumption relationship that specifies a certain amount of electricity consumption from an unknown source of electricity. This consumption relationship could be represented by a connection between the first data node 222 and an "unknown" data node 222 representing the unknown source of electricity.

Ontological plane 204 stores metadata associated with each data node 222. As shown in FIG. 2, ontological plane 204 includes nodes and/or elements representing instances 206, locations 208, time frames 210, sources 212, classes 214, and attributes 216 associated with data nodes 222.

Instances 206 correspond to metadata-based representations of individual data nodes 222 in data plane 202. More specifically, each data node 222 in data plane 202 can be associated with a unique instance in ontological plane 204. Each instance node additionally includes one or more locations 208, time frames 210, sources 212, classes 214, and/or attributes 216 that describe the corresponding data node 222.

Locations 208 include regions and/or other geographic descriptors of the corresponding data nodes 222. For example, each instance could specify a location for the corresponding data node 222. Additionally, ontological plane 204 can store a tree and/or another type of hierarchical structure under which locations 208 are organized. For example, the hierarchical structure could include a root node with a geographic identifier of "World." This root node could include child nodes with geographic identifiers of different continents. Each node representing a continent could include child nodes representing different countries in that continent, and each node representing a country could include child nodes representing different states, provinces, and/or regions within that country. Consequently, a given parent node in the hierarchical structure could represent a region that partially or fully encompasses the regions represented by all child nodes of that parent node. To facilitate the understanding and/or determination of similarities and/or relationships across data nodes 222, a single location that is assigned to multiple instances 206 can be indicated by having each instance point to the node representing the location within the hierarchical structure.

Time frames 210 denote ranges of time within which data associated with instances 206 is assumed to be correct. For example, each instance could include one time frame that specifies a "from" timestamp and an "until" timestamp. The "from" and "until" timestamps could be set to the same value to describe an instant in time. The "from" and "until" timestamps could alternatively be set to different values to indicate a period over which data is considered to be valid (e.g., collected, reported by a research paper, etc.).

Sources 212 represent sources of data in data nodes 222. For example, each source could specify the author of the data, a location (e.g., Uniform Resource Locator (URL), citation, etc.) of the data, and/or additional information related to the source.

Classes 214 form a shared ontology over entities represented by data nodes 222. More specifically, classes 214 are organized under one or more ontology trees that can be used to determine similarities, differences, and/or other semantic relationships between the corresponding entities. For example, classes 214 representing processes could be stored in one ontology tree, and classes 214 representing consumables could be stored in a different ontology tree. Each class could include a name and one or more aliases with the same semantic meaning as the name.

Each ontology tree can be constructed under a "similarity principle," in which a child class shares the same essence as a corresponding parent class and represents a subset of the parent class. For example, a "cotton T-shirt" class could be a child of a "T-shirt" class, the "T-shirt" class could be a child of a "shirt" class, the "shirt" class could be a child of a "wearable garment" class, and the "wearable garment" class could be child of a "textile" class.

Each ontology tree can also, or instead, be constructed under a "specificity principle," in which a child class differs from all direct and indirect parent classes in at least one attribute that is more specific than corresponding attributes associated with the parent classes. Continuing with the above example, the "cotton T-shirt" class would be associated with a specific fabric that distinguishes from other fabrics with which T-shirts can be made.

Each ontology tree can also, or instead, be constructed under an "opposition principle," in which sibling classes that share the same direct parent are at least partially incompatible and/or opposed to one another. Continuing with the above example, the "cotton T-shirt" class could have sibling classes of "polyester T-shirt," "wool T-shirt," and/or "cotton, polyester, and wool blend T-shirt."

Each ontology tree can also, or instead, be constructed under a "unique semantic axis principle," in which each class is found on a unique path through the ontology tree and occurs only once in a given ontology tree. In embodiments where processes and consumables are stored in separate ontology trees, a given class can appear in both ontology trees but only once in each ontology tree.

Attributes 216 describe individual instances 206 and/or variants of individual classes 214. For example, attributes 216 associated with a "cotton T-shirt" class could include (but are not limited to) a size, a color, a brand, whether or not the T-shirt is made of organic cotton, whether or not the T-shirt is waterproof, whether or not the T-shirt is maternity clothing, and/or how the T-shirt was made (e.g., by hand or by machine).

Each attribute can include 0 or more dimensions and continuous or discrete values for each dimension. For example, a 0-dimensional attribute for maternity clothing can be represented by a Boolean value indicating whether or not an article of clothing is considered maternity clothing. A one-dimensional attribute for clothing size could include discrete values of small, medium, or large. A multi-dimensional attribute for sizing of clothing tops could include dimensions of arm length, torso circumference, and chest circumference. Each of these dimensions could be specified using continuous values that span a certain range (e.g., a minimum length or circumference to a maximum length or circumference).

In some embodiments, attributes 216 and custom functional units specify values that are used in different contexts. For example, attributes 216 could be used to distinguish between different variants of classes 214 and/or different instances 206, while custom functional units could be used to store values that have a direct impact on consumptions, productions, emissions, and/or other measures that are computed in LCA.

Continuous attribute values can be correlated with emissions, functional units, classes of consumption relationships, and/or ontologies of consumption relationships. Attributes 216 can additionally be organized into groups, where attributes 216 within a given a group are mutually exclusive. For example, different size systems for clothing could be stored under the same group of attributes so that a given class of clothing can be associated with a single size from one size system.

Attributes 216 can additionally be validated in other ways. For example, a value assigned to a discrete attribute could be verified to be one of a set of possible attribute values for the discrete attribute. In another example, a value assigned to a continuous attribute could be verified to lie within a valid range for the continuous attribute. In a third example, one or more values assigned to an attribute could be verified to describe all dimensions of the attribute.

Figure 3:
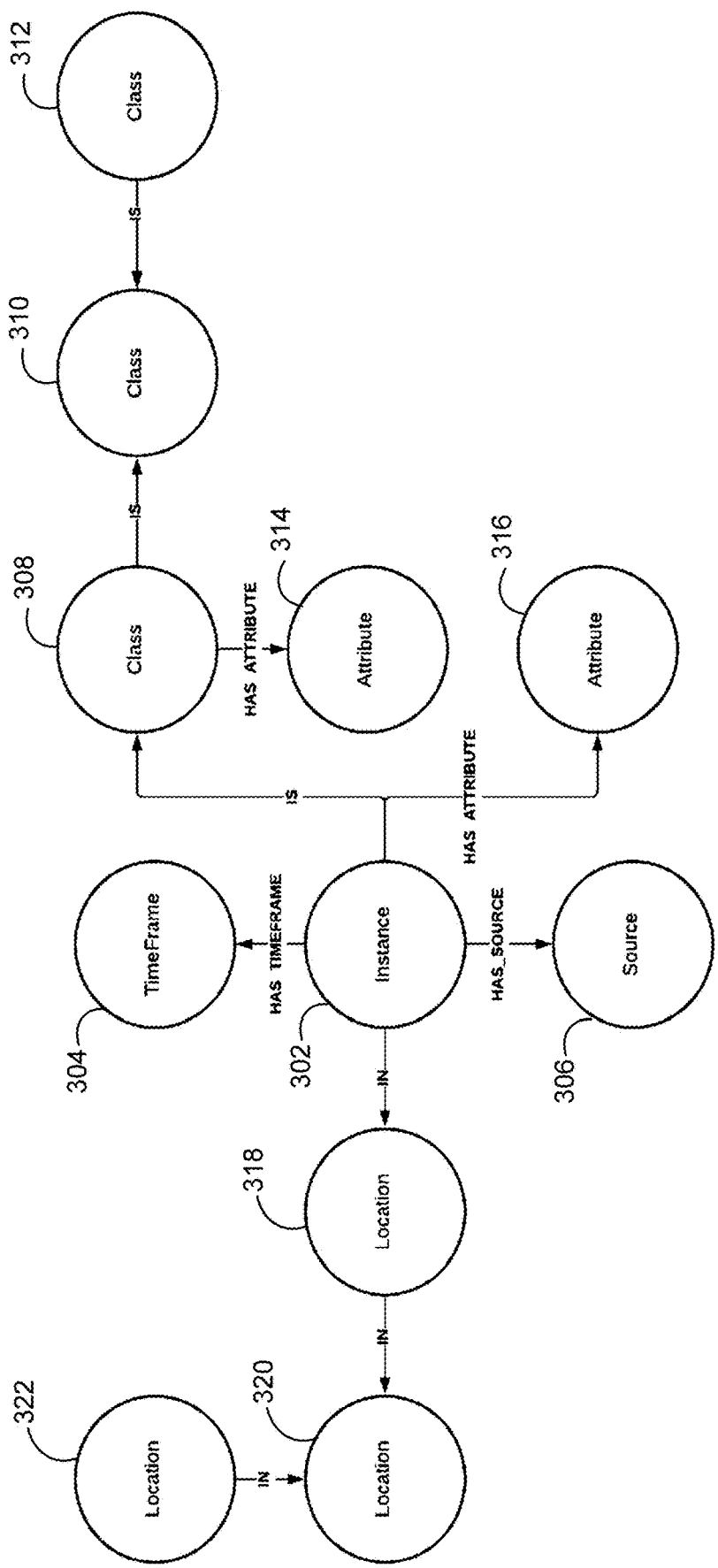
FIG. 3 illustrates an example schema associated with the ontological plane of FIG. 2, according to various embodiments.

FIG. 3 illustrates an example schema associated with ontological plane 204 of FIG. 2, according to various embodiments. As shown in FIG. 3, the schema includes a node 302 representing an instance. Node 302 includes a "HAS_TIMEFRAME" relationship with another node 304 that specifies a time frame for the instance. Node 302 also includes a "HAS_SOURCE" relationship with a third node 306 that specifies a source for data associated with the instance.

Node 302 includes an "IN" relationship with a fourth node 318 that specifies a location for data associated with the instance. Node 318 and a fifth node 322 that specifies another location additionally include "IN" relationships with a sixth node 320 that specifies a third location, thereby indicating that the third location represented by node 320 encompasses the locations represented by nodes 318 and 322.

Node 302 includes an "IS" relationship with a seventh node 308 that specifies a class for the instance. Node 308 and an eighth node 312 representing another class additionally have "IS" relationships with a ninth node 310 representing a third class, thereby indicating that the classes represented by nodes 308 and 312 are children of the class represented by node 310.

Node 308 includes a "HAS_ATTRIBUTE" relationship with a tenth node 314 representing an attribute. Node 302 similarly includes a "HAS_ATTRIBUTE" relationship with an eleventh node 316 representing a different attribute. The attribute represented by node 314 is used to modify the class represented by node 308, and the attribute represented by node 316 is used to modify the instance represented by node 302.

Returning to the discussion of FIG. 2, evaluation engine 124 uses data nodes 222 stored in data plane 202 and metadata stored in ontological plane 204 in database 122 to process a query 232. As shown in FIG. 2, query 232 specifies one or more classes 242 and/or one or more constraints 244.

Classes 242 identify one or more entities for which emissions, consumptions, productions, and/or other environmental impacts are to be computed. For example, classes 242 could include names and/or concepts to be matched to one or more classes 214 in ontological plane 204.

Constraints 244 include additional parameters that can be used to modify assumptions and/or values associated with LCA models and/or components stored in database 122. More specifically, constraints 244 can include primary data from a source that is external to database 122 (e.g., a system querying database 122). This primary data can be used to modify locations 208, time frames 210, sources 212, attributes 216, functional units, and/or other data or metadata associated with data nodes 222, relationships associated with data nodes 222, instances 206 corresponding to data nodes 222, productions, emissions, and/or other components of database 122. For example, each constraint could include units, values (e.g., discrete values, continuous values, multidimensional values, etc.) of the units, and/or a type of node or record in database 122 (e.g., classes 214, processes, emissions, consumptions, etc.) to which the constraint pertains. Thus, a constraint could be used to specify that a product includes a blend of 80% cotton and 20% polyester, contains cotton, contains organic cotton, contains cotton from a certain country, is made in a certain country, includes a total of 20 grams of cotton, has a total weight of 200 grams, has a precursor with total emissions of 1 kg of CO2e, and/or includes cotton yarn that was produced via a ring spinning technique.

In some embodiments, constraints 244 include input constraints, location constraints, time constraints, and/or emissions constraints. An input constraint can be used to mutate the consumptions of a data node. A given input constraint defines a subject and a list of inputs, where each input can be used to add, delete, or replace a consumption.

For example, input constraints can include the following definition:

```
type InputConstraint struct {
    SubjectSpecifier
    Inputs              [ ]InputSpecification
    FunctionalUnit      *unit.FunctionalUnit
}
type InputSpecification struct {
    Is                  ClassSpecifier
    FunctionalUnit      unit.FunctionalUnit
```

```
    Replace           bool
    ReplaceSubject    *ClassSpecifier
    Delete            bool
    Add               bool
}
```

In the above definition, an input constraint is defined as a struct data type. The struct includes a "SubjectSpecifier" that specifies a subject to which the input constraint pertains (e.g., the subject of a consumption). The input constraint struct also includes a list of inputs. Each input is also defined as a struct and includes a "ClassSpecifier," a functional unit, and a set of Boolean values that indicate whether or not the input is used to replace, delete, or add a consumption. When the Boolean values indicate that a consumption is to be replaced, the class of the subject can be replaced with a different class associated with the "ReplaceSubject" field.

A location constraint can be used to change the location associated with a given data node 222. For example, the location constraint could be used to set the location to a different region, a more specific region, and/or a less specific region.

A time constraint can be used to update the time of a given data node 222. For example, the time constraint could specify a start time, end time, and/or instance in time associated with the data node.

An emission constraint can be used to override the emissions of a given data node 222 and dependencies of the data node. For example, emission constraints can include the following definition:

```
    type EmissionsConstraint struct {
        SubjectSpecifier
        Emits [ ]carbongraph.Emission
    }
```

In the above definition, an emission constraint is defined as a struct data type. The struct includes a "SubjectSpecifier" that specifies a subject to which the emission constraint pertains (e.g., a data node for which emissions are to be overridden). The emission constraint struct also includes a list of emissions.

An example emission constraint within the list can include the following representation:

```
{
    "Type": "Emission",
    "Value": {
        "ForPath": { "Segments": [{ "Class": ["Example"] }] },
        "Emits": [
            {
                "Gas": "CO2e",
                "Value": 12,
            }
        ],
    }
}
```

The representation specifies a class of "Example" to which the emission constraint applies, as well as a gas of "CO2e" and a value of "12" for the emission. This emission constraint thus indicates that the "CO2e" emissions of a data node with a class of "Example" should be overridden with a value of 12.

In some embodiments, classes 242 and/or constraints 244 within query 232 are specified using a flexible query language. This query language allows complex constraints 244 to be defined for a variety of queries and/or use cases. For example, the query language could include the following specification:

```
    type Query = {
        Specifier: Specifier,
        Constraints: Array<Constraint>
    }
    type Constraint = {
        Type: "Input",
        For?: Array<string>,
        ForPath: Path,
        Input: Specifier,
    } | {
        Type: "Process",
        For?: Array<string>,
        ForPath: Path,
        Process: Specifier,
    } | {
        Type: "Emission",
        For?: Array<string>,
        ForPath: Path,
        Emission: EmissionSpecifier,
    } ...
    type EmissionSpecifier = {
        Gas: string
        FunctionalUnit: FunctionalUnit,
    }
    type Specifier = {
        Is: Array<string>,
        In: Array<string>,
        At: string,
        FunctionalUnit: FunctionalUnit,
    }
    type FunctionalUnit = Array<{
        Unit: string,
        Value: number,
    }>
    type Path = {
        Segments: Array<{
            Location?: Array<string>,
            Class?: Array<string>,
        }>
    }
```

In the above definition, a given query 232 includes a "Specifier" property that identifies criteria associated with the query, as described by the "Specifier" type. The "Specifier" includes an "Is" array describing one or more classes representing an entity, an "In" array describing one or more locations of the entity, an "At" field describing a time or time frame associated with the entity, and a functional unit. The query also includes a list of constraints 244. Each constraint in the array can be described by the "Constraint" type.

The above definition indicates that a given constraint can represent an "Input" constraint, a "Process" constraint, an "Emission" constraint, and/or another type of constraint. Each type of constraint includes a property named "ForPath," which is a locator that specifies a "Path" within a tree (e.g., trees 224) to which the constraint should apply. For example, a constraint that changes the electricity consumption of a process for assembling a T-shirt could include a path that includes a class named "T-Shirt" and a class named "Assembly":

```
{ Segments: [ { Class: ["T-Shirt"] }, { Class: ["Assembly"] } ] }
```

Each type of constraint can also, or instead, include a "For" property that specifies one or more classes 214 to which the constraint should apply.

The above definition also indicates that each type of constraint is associated with a different specifier. The "Emission" constraint includes an "EmissionSpecifier" that indicates a type of gas being emitted and a functional unit used to measure the emission. The "Input" and "Process" constraints include the same "Specifier" as the query. The "Specifier" includes multiple arrays that describe an identity (e.g., class), location, time, functional unit, and/or other properties associated with the corresponding entity and/or constraint.

The above definition additionally indicates that a functional unit includes an array of measurement units with associated values. Each element in the array includes a "Unit" that describes the type or name of the unit and a "Value" that specifies a numerical value for that unit.

An example query 232 that uses the above specification includes the following:

```
Specifier:
    Is: ["Cotton T-Shirt"]
    In: ["China"]
    At: "2020-01-01"
    FunctionalUnit:
    - Unit: g
      Value: 200
Constraints:
- Type: Input
  For: ["Cotton T-Shirt"]
  Input:
    Is: ["Organic Cotton", "Cotton", "Materials"]
    FunctionalUnit:
    - Unit: fraction
      Value: 0.8
- Type: Input
  For: ["Garment Manufacturing"]
  Input:
    Is: ["Electricity"]
    FunctionalUnit:
    - Unit: kWh
      Value: 1000
    - Unit: year
      Value: 1
- Type: Process
  For: ["Cotton Cultivation"]
  Process:
    In: ["India"]
- Type: Emission
  For: ["Cotton Jersey"]
  Emission:
    Gas: CO2e
    FunctionalUnit:
    - Unit: kg
      Value: 1
- Type: Process
  For: ["Cotton Yarn Spinning"]
  Process:
    Is: ["Ring Spinning", "Cotton Yarn Spinning"]
```

The above example query includes a "Specifier" that indicates a class of "Cotton T-Shirt" in a location of "China" at a time of "2020 Jan. 1." The query also includes a functional unit that specifies a unit of grams and a value of 200. The query additionally includes five constraints. The first constraint is an input constraint for a consumption associated with a "Cotton T-Shirt" data node 222. The first constraint indicates that the consumption relates to one or more consumables denoted by "Organic Cotton," "Cotton," and/or "Materials." The first constraint also includes a fractional functional unit of 0.8, which is multiplied with the functional unit associated with the consumable(s).

The second constraint is an input constraint for a consumption associated with a "Garment Manufacturing" data node 222. The second constraint indicates that the consumption relates to a consumable of "Electricity" with two functional units of 1000 kWh and one year, respectively.

The third constraint is a process constraint for a "Cotton Cultivation" data node 222. The third constraint specifies that the process represented by the data node has a location of "India."

The fourth constraint is an emission constraint for emissions related to a "Cotton Jersey" data node 222. The fourth constraint includes a gas of "CO2e" and a functional unit of 1 kg for the emitted gas.

The fifth constraint is a process constraint for a "Cotton Yarn Spinning" data node 222. The fifth constraint indicates that the process represented by the data node can be categorized as "Ring Spinning" and/or "Cotton Yarn Spinning."

As shown in FIG. 2, evaluation engine 124 executes query 232 by creating a virtual node that is included in a set of unknown nodes 238. The virtual node is stored in memory and represents an unknown consumption to be resolved using database 122. The virtual node includes the same properties (e.g., classes 242 and constraints 244) as query 232 and is identified as a "query node" that represents query 232.

Evaluation engine 124 also matches the virtual node to a set of similar data nodes 240 in database 122. In one or more embodiments, similar data nodes 240 are determined via a similar node search technique that searches and/or traverses one or more trees 224 of data nodes 222 within database 122, as described in further detail below with respect to FIGS. 4A and 4B.

Evaluation engine 124 uses the set of similar data nodes 240 to perform computations 248 related to query 232. For example, evaluation engine 124 could compute emissions, productions, emissions, waste product allocations, and/or other values representing the environmental impacts of the entity represented by query 232. During computations 248, evaluation engine 124 can create additional unknown nodes 238 upon encountering the corresponding unknown consumptions during traversals that determine similar data nodes 240. Evaluation engine 124 can also repeat the process of matching these unknown nodes 238 to similar data nodes 240 and performing computations 248 for these similar data nodes 240 until all unknown nodes 238 have been resolved into similar data nodes 240 with known consumptions.

Evaluation engine 124 also performs aggregations 250 of computations 248 associated with similar data nodes 240 to generate results 246 of query 232. These results 246 can include a tree structure that represents the emissions breakdown associated with similar data nodes 240 selected during processing of query 232. These results 246 can also, or instead, include total emissions, productions, waste product allocations, and/or other values generated during computations 248 across similar data nodes 240.

Figure 4A:
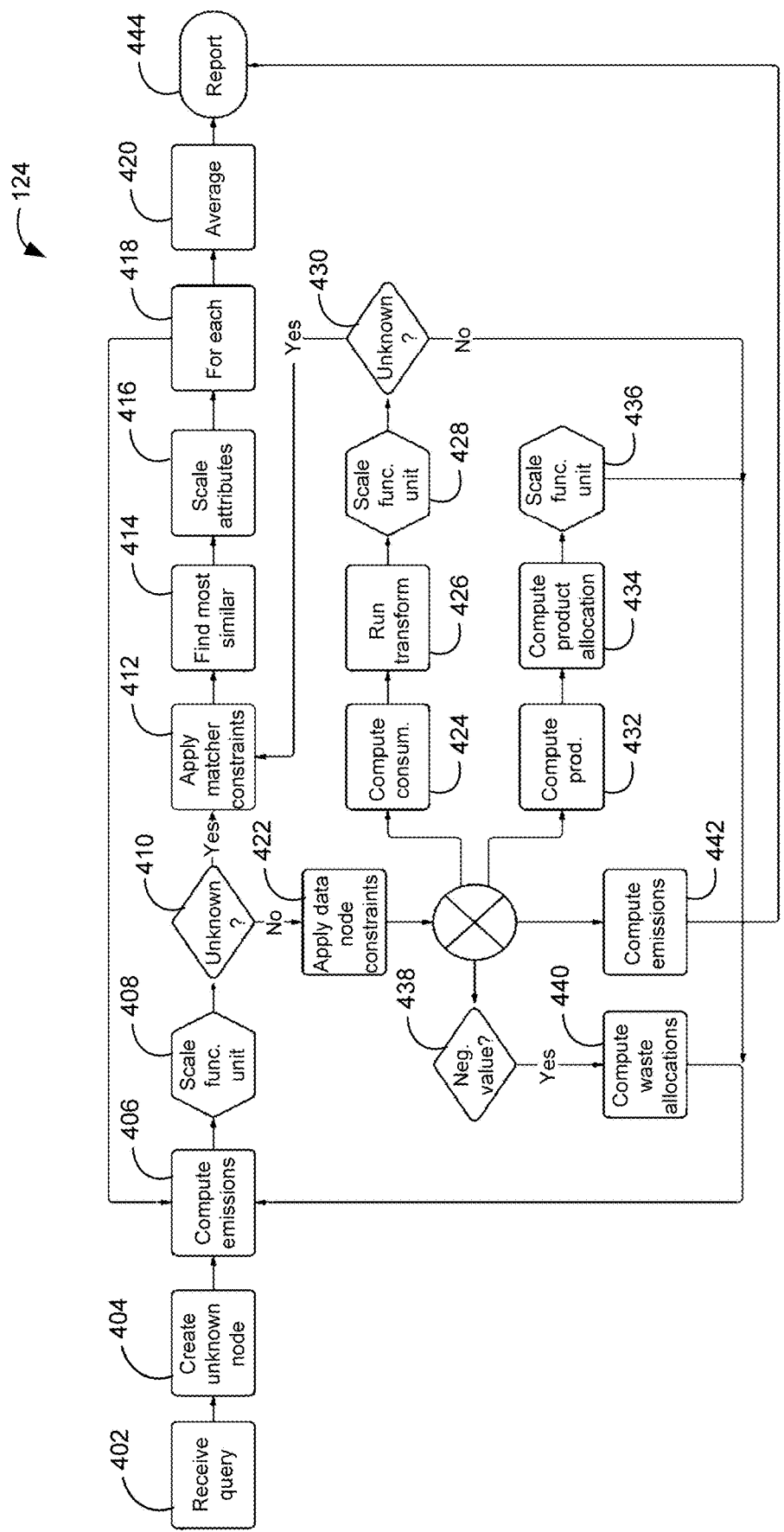
FIG. 4A illustrates how the evaluation engine of FIG. 1 processes a query, according to various embodiments.

FIG. 4A illustrates how evaluation engine 124 of FIG. 1 processes a query, according to various embodiments. As shown in FIG. 4A, evaluation engine 124 begins by performing a step 402 of receiving a query, such as query 232 of FIG. 2. Next, evaluation engine 124 performs a step 404 of creating an unknown node representing the query. This unknown node can be stored in memory and include one or more classes, one or more constraints, and/or other parameters of the query. The unknown data node can represent an unknown consumption and/or unknown emission.

Evaluation engine 124 then performs a step 406 of computing emissions for a current node, which corresponds to the unknown node created in step 404. To do this, evaluation engine 124 performs a step 408 of scaling a functional unit of the current node to match a current context of the query. Because the functional unit of the current node is the same as the functional unit associated with the current context of the query (i.e., the functional unit specified in the query), no scaling is needed at this point.

Evaluation engine 124 then performs a step 410 of determining whether the current node is unknown. This step 410 evaluates to true, so evaluation engine 124 performs a step 412 of applying matcher constraints to the current node, in which the current node is changed using relevant constraints specified in the query. Evaluation engine 124 then performs a step 414 of finding the most similar data nodes using the retrieved matcher constraints.

Figure 4B:
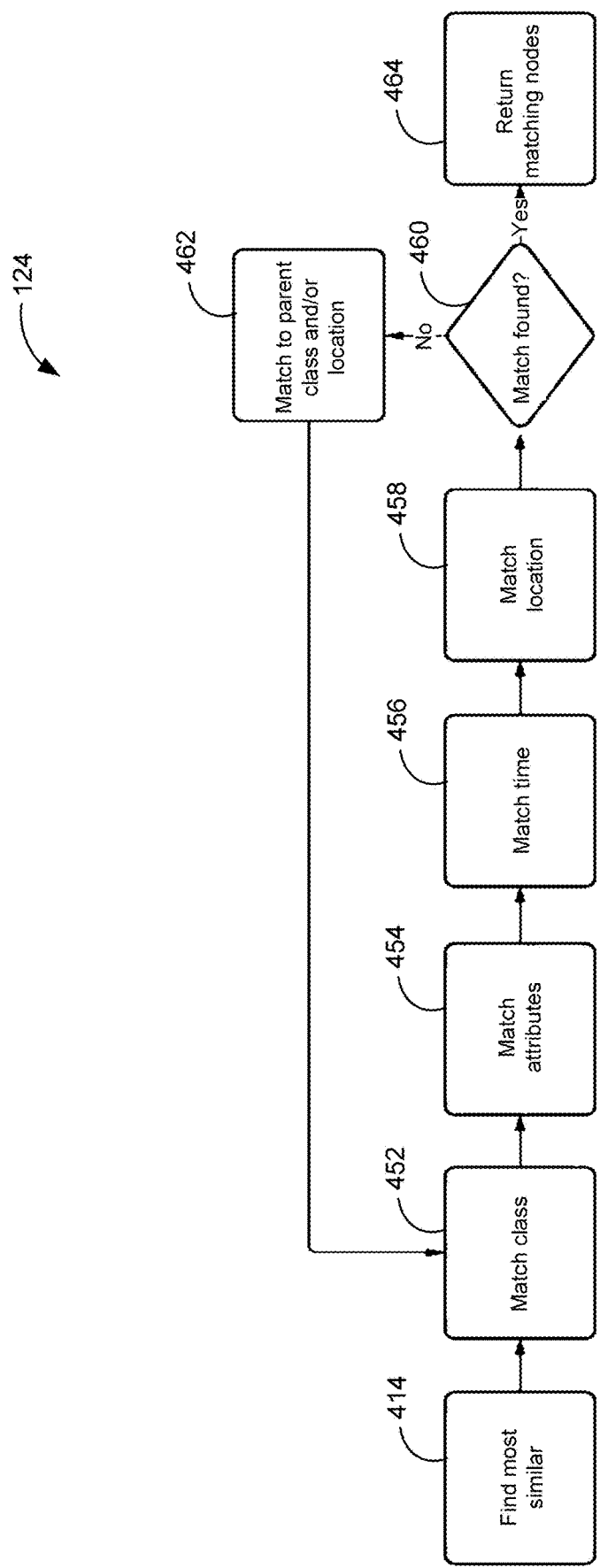
FIG. 4B illustrates how the evaluation engine of FIG. 1 matches an unknown data node to a set of similar data nodes, according to various embodiments.

FIG. 4B illustrates how evaluation engine 124 of FIG. 1 matches an unknown data node to a set of similar data nodes, according to various embodiments. As shown in FIG. 4B, this matching process is initiated using step 414. Next, evaluation engine 124 performs a step 452 of matching a class in the unknown data node to data nodes 222 in database 122. For example, evaluation engine 124 could perform step 452 by searching data nodes 222 for names and/or aliases that exactly, substantially, and/or semantically match the class specified in the query.

Evaluation engine 124 then performs a step 454 of matching attributes in the unknown data node to data nodes 222 in database 122. For example, evaluation engine 124 could perform step 454 by filtering nodes retrieved in step 452 by the attributes.

Evaluation engine 124 additionally performs a step 456 of matching a time in the unknown data node to data nodes 222 in database 122, followed by a step 458 of matching a location in the unknown data node to data nodes 222 in database 122. In each of steps 456 and 458, evaluation engine 124 can further filter data nodes 222 determined in previous steps by the corresponding constraint values. Evaluation engine 124 can also omit steps 454, 456, and/or 458 if the matcher constraints do not specify attributes, a time, and/or a location, respectively.

Evaluation engine 124 subsequently performs a step 460 of determining whether or not any matching data nodes are found. For example, evaluation engine 124 could determine that a given data node 222 in database 122 is a match if the class of the data node matches the class in the unknown data node and/or is a direct or indirect child of the class in the unknown data node. Evaluation engine 124 could also, or instead, determine that a given data node 222 in database 122 is a match if the location specified in the data node matches the location in the unknown data node and/or is a direct or indirect child of the location in the unknown data node. Evaluation engine 124 could also, or instead, determine that a given data node 222 in database 122 is a match if the attributes associated with the data node match the attributes specified in the unknown data node. If no data nodes 222 in database 122 match the attributes in the unknown data node, evaluation engine 124 could determine that all data nodes that match the class and location in the unknown data node are matching data nodes. Evaluation engine 124 could also, or instead, determine that a data node is a match if the time frame in the data node is the closest to the time specified in the unknown data node.

If one or more matching data nodes are found, evaluation engine 124 performs a step 464 to return the matching data nodes. For example, evaluation engine 124 could store the matching data nodes and corresponding relationships in one or more in-memory data structures. The matching data nodes can be stored under a root node corresponding to the query node and correspond to one or more sub-trees and/or paths in trees 224. Each sub-tree and/or path can include one or more data nodes that match the class, location, attributes, and/or time specified in the unknown data node. Each sub-tree and/or path can also, or instead, include one or more data nodes with classes and/or locations that "indirectly" match the class and/or location specified in the unknown data node (e.g., data nodes with classes and/or locations that are direct or indirect children of the class and/or location specified in the unknown data node). Each sub-tree and/or path can also, or instead, include additional data nodes that are dependencies (e.g., consumptions, productions, emissions, etc.) of the data node(s) that directly or indirectly match the class, location, attributes, and/or time specified in the unknown data node.

If no matching nodes are found, evaluation engine 124 performs a step 462 of matching to a parent class and/or location associated with the unknown data node. For example, evaluation engine 124 could change the location used to find matching data nodes to a parent location of the location in the unknown data node if the hierarchy of locations 208 in ontological plane 204 includes a parent location for the location in the unknown data node. Evaluation engine 124 could also, or instead, change the class used to find matching data nodes to a parent class of the class in the unknown data node if the ontology tree of classes 214 in ontological plane 204 includes a parent class for the class in the unknown data node.

Evaluation engine 124 then repeats steps 452, 454, 456, 458, and 460 with the parent class and/or location. Evaluation engine 124 can also repeat step 462 to further reduce the granularity associated with the matches until matching nodes are found. Evaluation engine 124 can then perform step 464 to return the matching data nodes.

Alternatively, if evaluation engine 124 is unable to find any matching data nodes and cannot further change the class and/or location used to find the matching data nodes, evaluation engine 124 can return an error indicating that no matching nodes are found. This error can then be returned in a response to the query instead of performing additional processing of the query.

While the operation of evaluation engine 124 in matching a given data node to similar data nodes has been described above with respect to steps 452, 454, 456, 458, 460, 462, and 464, it will be appreciated that evaluation engine 124 can use other techniques to determine similar data nodes for a given unknown data node. For example, evaluation engine 124 could compute similarity scores between the unknown data node and some or all data nodes 222 in database 122. A given similarity score between the unknown data node and another data node could include a weighted combination of similarity measures between properties (e.g., class, attributes, time, location, etc.) of the data node and corresponding properties of the other data node. These similarity measures could include (but are not limited to) vector similarities between embeddings of the properties, measures of semantic similarity between the properties, measures of similarity between tokens and/or strings in the properties, binary values denoting exact matches between the properties, and/or other measures computed between the properties of the data node and corresponding properties of the other data node. Evaluation engine 124 could rank data nodes 222 by descending similarity score and return a set of highest ranked data nodes 222 as the most similar nodes. In another example, evaluation engine 124 could use a clustering technique and/or machine learning model to identify the most similar nodes based on properties of the unknown data node and corresponding properties of other data nodes. In a third example, evaluation engine 124 could use one or more properties of the unknown data node as search terms and/or filters for other data nodes in database 122.

Returning to the discussion of FIG. 4A, after evaluation engine 124 has found a set of similar nodes in step 414, evaluation engine 124 performs a step 416 of scaling attributes associated with the similar nodes. For example, evaluation engine 124 could determine scaling factors that can be used to convert yarn density values specified in attributes of the similar nodes to a yarn density value specified in a corresponding attribute of the unknown data node. These scaling factors could then be applied to energy consumptions and/or other calculations associated with the similar nodes.

Evaluation engine 124 then performs a step 418 that iterates over the similar nodes and repeats steps 406, 408, and 410 for each of the similar data nodes. If evaluation engine 124 determines at step 410 that a data node is not unknown, evaluation engine 124 performs a step 422 of applying any relevant data node constraints specified in the query to the data node. Evaluation engine 124 then performs multiple types of computations related to the data node.

As shown in FIG. 4A, evaluation engine 124 performs a step 424 of computing consumptions associated with the data node. For example, evaluation engine 124 could compute emissions of all data nodes with which the data node has a consumption relationship. While computing consumptions, evaluation engine 124 can also perform a step 426 of running a transform function on functional units associated with a given consumption relationship if the transform function is defined for the consumption relationship. Evaluation engine 124 can additionally perform a step 428 of scaling the functional units resulting from steps 424 and 426 to match the current context of the query. Evaluation engine 124 can then perform a step 430 to determine whether or not any of the consumptions are unknown. If this step 430 evaluates to true, evaluation engine 124 returns to step 412 so that each unknown consumption, as represented by an unknown data node, can be matched to similar data nodes with known consumptions.

Evaluation engine 124 also performs a step 432 of computing productions associated with the data node. For example, evaluation engine 124 could identify all data nodes with which the data node has a production relationship.

Evaluation engine 124 can also perform a step 434 of computing product allocations associated with the productions. In step 434, evaluation engine 124 can assign an economic value to one or more data nodes with which the data node has a production relationship.

For example, evaluation engine 124 could retrieve an economic value associated for each product of a process represented by the data node as a price from another data node representing the product. Evaluation engine 124 could use the economic value to allocate emissions of the process across all products of the process, so that the emissions allocated to a given product is proportional to the economic value of the product. Evaluation engine 124 could also, or instead, allocate emissions of the process evenly across the products and/or based on another technique. After productions and product allocations are computed for the data node, evaluation engine 124 can perform a step 436 of scaling the functional units resulting from steps 432 and 434 to match the current context of the query.

Evaluation engine 124 additionally performs a step 438 of determining whether or not a production associated with the data node has a negative economic value. Continuing with the above example, a negative economic value (e.g., a value of −1) can be assigned to a production relationship between the data node and another data node representing a product when the product is considered to be a waste product of the process represented by the data node.

When a negative economic value exists for a production associated with the data node, evaluation engine 124 performs a step 440 of computing waste allocations for the product. In step 440, evaluation engine 124 can allocate emissions of any processes consuming the product to the data node representing the production process of the product.

Finally, evaluation engine 124 can perform a step 442 of computing emissions for the data node. For example, evaluation engine 124 can aggregate emissions of the data node and all data nodes with which the data node has a production or consumption relationship. Evaluation engine 124 can then return to step 406 to repeat the process for additional data nodes.

After all unknown data nodes have been resolved into similar data nodes with known emissions and/or consumptions and emissions have been computed for these data nodes, evaluation engine 124 performs a step 444 of reporting results that include these emissions. For example, evaluation engine 124 could aggregate computations associated with multiple data nodes into total emissions, consumptions, productions, and/or other values for the entity represented by the query. Evaluation engine 124 could also, or instead, compute a breakdown of the total values into contributions of individual data nodes matched to the entity represented by the query.

The operation of evaluation engine 124 in FIGS. 4A and 4B can be illustrated using the following example query:

```
Specifier:
    Class: ["Fuel Combustion", "Diesel Combustion"] # REQUIRED
    Attributes:
    - Name: Terrain
      Value: Urban
    FunctionalUnit:
      Values:
      - Unit: 1
        Value: 2.5
Constraints:
- Type: Time
  Value:
    ForPath:
      Segments:
      - Class: ["Fuel"]
    At: '2022-01-01T20:00:00Z'
```

The above query includes a specifier that specifies two classes of "Fuel Combustion" and "Diesel Combustion." The specifier also includes an attribute with a name of "Terrain" and a value of "Urban" and a functional unit with a unit of liters and a value of 2.5. The query additionally includes a time constraint that specifies a time of "2022-01-01T20:00:00Z" for a "Fuel" class. The example query can thus be used to determine the environmental impacts of an entity represented by the combustion of 2.5 liters of diesel on an urban terrain, given a time of production of the fuel in 2022.

Upon receiving the query in step 402, evaluation engine 124 performs step 404 to create an in-memory virtual unknown data node representing the query. This unknown data node corresponds to a query node that includes the same properties (e.g., classes, attribute, functional unit, time constraint) as the query and indicates that consumptions and/or emissions associated with the entity are unknown.

Evaluation engine 124 performs step 406 to begin the process of computing emissions for the newly created "current" node. In particular, evaluation engine 124 performs step 408 to scale the functional unit of the current node to the functional unit specified in the query. Since the functional unit of the current node is identical to the functional unit specified in the query, the functional unit of the current node is unchanged by step 406.

Evaluation engine 124 performs step 410 to determine whether or not the current node is unknown. Because step 410 evaluates to true, evaluation engine 124 performs step 412 to apply matcher constraints from the query to the unknown data node. To perform step 412, evaluation engine 124 iterates over constraints and determines if a "For" field is defined in each constraint. Evaluation engine 124 checks if the class of the current unknown data node matches the class specification in the "For" field. If a match is found, evaluation engine 124 applies the constraint. Because the time constraint specified in the query includes only a "ForPath," field, no constraints related to a "For" field are applied.

Next, evaluation engine 124 checks if each constraint includes a "ForPath" field. If a given constraint includes the "ForPath" field, evaluation engine 124 determines if the path defined in the "ForPath" field matches the current context associated with the unknown data node. In this example, the time constraint includes a "ForPath" field specifying one "Segment" (e.g., a subtree in data plane 202) that includes a class name of "Fuel." Evaluation engine 124 determines if the current unknown node matches this segment by determining whether the class of the current unknown node matches the class name of "Fuel." If a match is found, evaluation engine 124 applies the constraint to the current unknown data node. Because the current unknown node has a class of "Diesel Combustion," no match is found, and therefore the constraint is ignored.

Evaluation engine 124 then performs step 414 to match the current node to the most similar nodes in database 122. During this matching process, evaluation engine 124 performs step 452 to search database 122 for nodes that match the "Diesel Combustion" class or any sub-class of the "Diesel Combustion" class. Evaluation engine 124 determines, as a result of the search, that each of two sub-classes of "1,600 cc Motor Diesel Motor Operation" and "2000 cc Motor Diesel Motor Operation" is assigned to three data nodes 222, and that the three data nodes include attributes representing different terrains of "Rural," "Urban," and "Mountainous." Because similar nodes were returned by the search, evaluation engine 124 does not step up to a parent class of the "Diesel Combustion" class to find less accurate matches. Additionally, because all matches are equally distant from the desired class (i.e., all matching nodes are one level removed from the "Diesel Combustion" class), all classes of the matching data nodes are treated as being equally relevant. Thus, no additional filtering of the matching nodes is performed using classes.

Next, evaluation engine 124 performs step 454 to match attributes of the matching data nodes with attributes in the current node. For each of the six matching data nodes returned by the search, evaluation engine 124 computes a score representing the extent to which the attributes associated with the data node match the attributes of the current unknown data node. Here, evaluation engine 124 computes the score based on the similarity between the terrain attribute of each returned data node and the "Urban" terrain attribute of the current unknown data node. In this example, evaluation engine 124 computes nonzero scores for the two data nodes that have the same "Urban" terrain attribute as the current node and belong to the "1,600 cc Motor Diesel Motor Operation" and "2000 cc Motor Diesel Motor Operation" classes, respectively. Evaluation engine 124 also computes scores of 0 for the remaining four data nodes returned in the search.

Evaluation engine 124 performs step 456 to match the time frames for the two matched data nodes to the time associated with the unknown data node. Because the unknown data node does not specify a time or time frame, both matched data nodes are treated as equally good matches in step 456.

Evaluation engine 124 also performs step 458 to match the locations of the two matched data nodes to the location associated with the unknown data node. Because the unknown data node does not specify a location, both matched data nodes are treated as equally good matches in step 458.

Evaluation engine 124 performs step 460 to determine that both data nodes with the "Urban" terrain attribute and the "1,600 cc Motor Diesel Motor Operation" and "2000 cc Motor Diesel Motor Operation" classes, respectively, are matches. Evaluation engine 124 then performs step 464 to return the two matching nodes.

After the two matching data nodes are returned in step 414, evaluation engine 124 performs step 416 to scale attributes of the returned data nodes. Because these data nodes do not include numeric attributes that can be scaled, this step 416 is skipped.

Evaluation engine 124 then performs step 418 to iterate over the two matching data nodes. Evaluation engine 124 begins with step 406 to compute emissions for the data node with the "1,600 cc Motor Diesel Motor Operation" class. Evaluation engine 124 proceeds to step 408 to scale the functional unit of this data node to the 2.5 liter functional unit of the query. In this example, the functional unit of the "1,600 cc Motor Diesel Motor Operation" data node is set to 1 liter. As a result, evaluation engine 124 computes a scaling factor as the ratio of the functional unit for the query to the functional unit for the "1,600 cc Motor Diesel Motor Operation" data node, or 2.5. This scaling factor can then be applied to emissions, consumptions, and productions associated with the "1,600 cc Motor Diesel Motor Operation" data node.

Evaluation engine 124 performs step 410 to determine that the "1,600 cc Motor Diesel Motor Operation" data node is a known data node. Because the "1,600 cc Motor Diesel Motor Operation" data node is known, evaluation engine 124 proceeds to step 422 to apply data node constraints. In this example, step 422 can be skipped because the query does not specify any constraints for this data node.

Evaluation engine 124 also performs steps 438 and 440 based on economic values for productions associated with the "1,600 cc Motor Diesel Motor Operation" data node. In this example, the "1,600 cc Motor Diesel Motor Operation" data node does not include productions with negative economic values, so no waste allocations are computed.

Evaluation engine 124 additionally performs steps 424, 426, and 428 to determine consumptions associated with the "1,600 cc Motor Diesel Motor Operation" data node. In this example, the data node includes a consumption relationship with a "Diesel" class that has an unknown consumption, so evaluation engine 124 determines in step 424 that consumptions should be computed for this data node. Evaluation engine 124 also skips step 426 because the unknown consumption does not have a transform function. Evaluation engine 124 then performs step 428 using the previously computed scale factor of 2.5 to convert the functional unit of 1 liter for the "1,600 cc Motor Diesel Motor Operation" data node into the 2.5-liter functional unit of the query.

Evaluation engine 124 determines in step 430 that the "Diesel" consumption associated with the "1,600 cc Motor Diesel Motor Operation" data node is unknown, and therefore creates another unknown data node representing the unknown consumption. This unknown data node includes properties (e.g., location and time) from the consuming "1,600 cc Motor Diesel Motor Operation" data node.

Evaluation engine 124 performs step 412 to apply matcher constraints to the newly created unknown data node. Here, the "Diesel" class of the unknown data node matches the "Diesel" class of the time constraint in the query. As a result, evaluation engine 124 applies the time constraint to the unknown data node by setting the time of the unknown data node to "2022-01-01T20:00:00Z."

Evaluation engine 124 performs step 414 to find data nodes that are similar to the unknown data node. In particular, evaluation engine 124 performs step 452 to retrieve two data nodes with the same "Diesel" class as the unknown data node. Both data nodes lack attributes and are therefore determined to be equally similar to the unknown data node in step 454. In step 456, evaluation engine 124 determines that the first data node has a time set to "2021 Jan. 1," and the second data node has a time set to "2020 Jan. 1." Because the first data node has a timestamp that is closer to the time specified in the time constraint, evaluation engine 124 determines that the first data node is more similar to the unknown data node.

In some embodiments, evaluation engine 124 matches a time constraint to multiple nodes if the difference in time across the data nodes is within 10% of the difference in time between the time constraint and time in the data nodes that is farthest from the time constraint. This allows the continuousness of the time dimension to be considered in determining similar nodes and can also prevent processing of a query to be overly sensitive to small differences in time. In this example, the times associated with the two data nodes are not within 10% of the two-year difference in time between the time specified in the time constraint and the time in the second data node. As a result, evaluation engine 124 determines that only the first data node matches the time constraint.

In step 458, evaluation engine 124 determines that both data nodes have the same location of "World." As a result, evaluation engine 124 does not make additional changes to the similarity of the data nodes to the unknown data node in step 458. Evaluation engine 124 then performs steps 460 and 464 to return the first data node as a matching data node.

Evaluation engine 124 skips step 416 for the returned data node because no attribute scaling is required. Evaluation engine 124 then performs step 418 to process the single returned data node. For this data node, evaluation engine performs steps 406, 408, 410, 422, 424, 426, 428, 430, 432, 434, 436, 438, 440, and 442. This data node does not include direct consumptions and specifies an emission of 100 g CO2e per liter. This emission is scaled by the 2.5 scale factor to 250 g CO2e per liter to complete computations for the "1,600 cc Motor Diesel Motor Operation" data node.

Evaluation engine 124 repeats the process with the "2,000 cc Motor Diesel Motor Operation" data node. More specifically, evaluation engine also performs steps 406, 408, 410, 422, 424, 426, 428, 430, 432, 434, 436, 438, 440, and 442 to compute an emission of 2,700 g CO2e for this data node.

Because evaluation engine 124 has now computed emissions for all data nodes matching the query node (i.e., the "1,600 cc Motor Diesel Motor Operation" data node and the "2,000 cc Motor Diesel Motor Operation" data node), evaluation engine 124 performs step 420 to average emissions from the data nodes into an overall emissions for the entity represented by the query. In this step, evaluation engine 124 can use a linear opinion pooling technique to combine distributions of emissions associated with the data nodes into a single distribution. For example, evaluation engine 124 could convert each distribution into a percentile distribution that stores 101 numbers between the 0 quantile and the 1 quantile. Evaluation engine 124 could convert each percentile distribution into a cumulative density function (CDF) and iterate over the CDFs of the two distributions. During each iteration, evaluation engine 124 computes an arithmetic mean of the densities of the CDFs and sets the density of the combined distribution at the corresponding point to the arithmetic mean. Evaluation engine 124 could then convert the CDF for the combined distribution back into a percentile distribution.

After distributions for emissions associated with the similar data nodes are merged into a combined distribution of emissions for the query node, evaluation engine 124 determines an expected value of 2,650 g CO2e for the combined distribution. Evaluation engine 124 then performs step 444 to report results that include the expected value and/or combined distribution. The results can also, or instead, include a breakdown of the 2,650 g CO2e into an emission value for each of the two similar data nodes.

Figure 5:
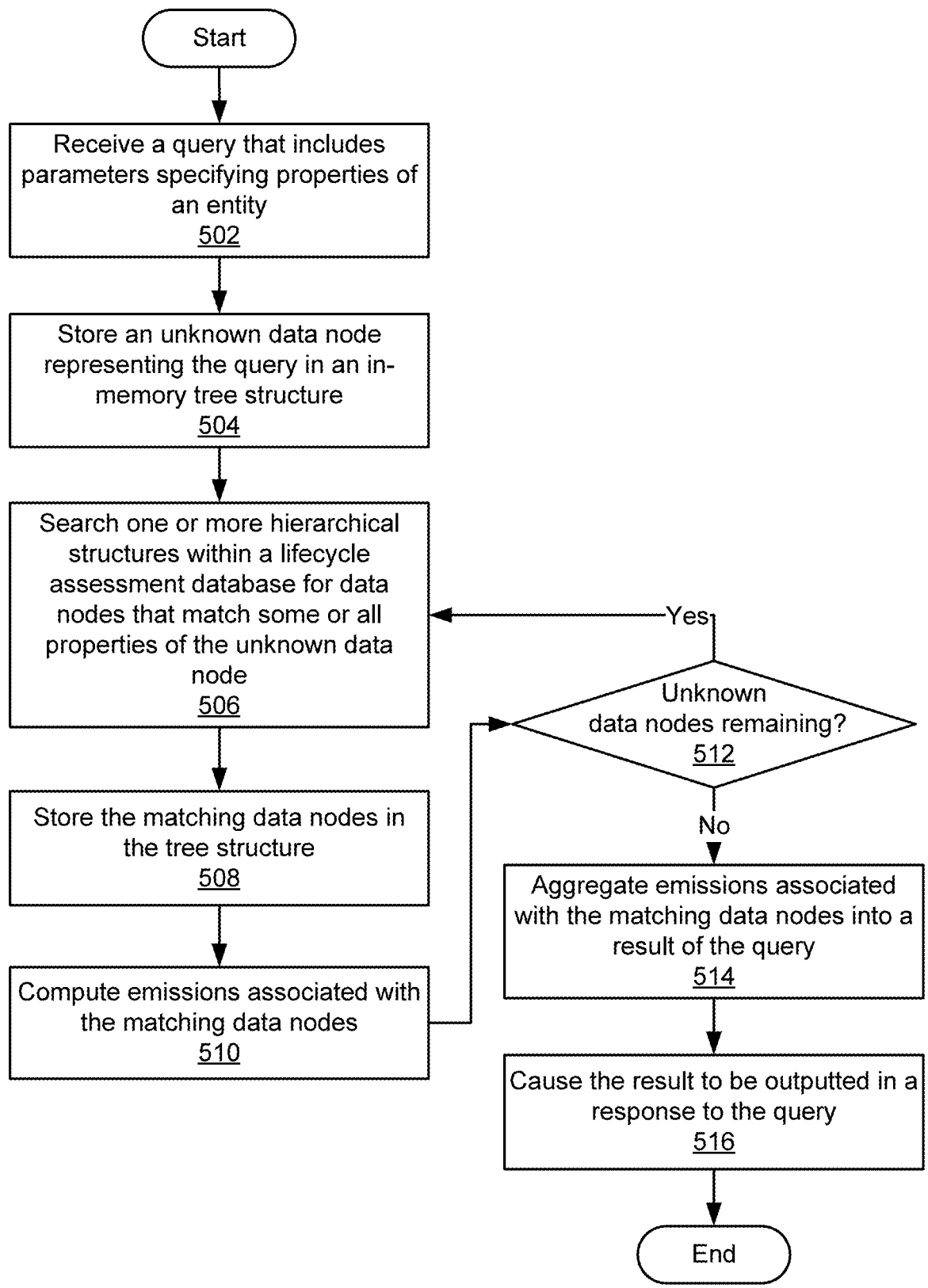
FIG. 5 is a flow diagram of method steps for processing a query of a life cycle assessment database, according to various embodiments.

FIG. 5 is a flow diagram of method steps for processing a query of an LCA database, according to various embodiments. Although the method steps are described in conjunction with the systems of FIGS. 1-2, persons skilled in the art will understand that any system configured to perform the method steps in any order falls within the scope of the present disclosure.

In step 502, evaluation engine 124 receives a query that includes parameters specifying properties of an entity. For example, evaluation engine 124 could receive a query that specifies one or more classes associated with the entity and/or one or more constraints associated with properties and/or dependencies of the entity. The classes and/or constraints could represent primary data associated with the entity.

In step 504, evaluation engine 124 stores an unknown data node representing the query in an in-memory tree structure. For example, evaluation engine 124 could create a "virtual" data node with an unknown consumption and/or unknown emission and initialize the tree structure with the virtual data node as root. Evaluation engine 124 could also set properties of the virtual data node to those specified in the query.

In step 506, evaluation engine 124 searches one or more hierarchical structures within the LCA database for data nodes that match some or all properties of the unknown data node. For example, evaluation engine 124 could determine the matching nodes based on exact matches, inexact matches, semantic matches, weighted combinations of matches, and/or other types of matches between properties of the data nodes in the LCA database and properties of the unknown data node. Evaluation engine 124 could also, or instead, prioritize matching of certain properties over matching of other properties.

In step 508, evaluation engine 124 stores the matching data nodes in the tree structure. For example, evaluation engine 124 could store the matching data nodes in one or more sub-trees under the root node representing the query.

In step 510, evaluation engine 124 computes emissions associated with the matching data nodes. For example, evaluation engine 124 could compute the emissions using functional units, transform functions, economic values, and/or other components of the matching data nodes and/or the query node. During step 510, evaluation engine 124 can encounter additional data nodes and/or relationships that are associated with unknown consumptions and/or unknown emissions. When an unknown consumption and/or unknown emission is encountered, evaluation engine creates another unknown data node representing the unknown consumption and/or unknown emission and adds the unknown data node to the tree.

In step 512, evaluation engine 124 determines whether or not unknown data nodes remain in the tree. For example, evaluation engine 124 could determine that unknown data nodes remain in the tree if one or more unknown data nodes were added to the tree during step 510. While unknown data nodes remain in the tree, evaluation engine 124 repeats steps 506, 508, and 510 for each unknown data node to resolve the corresponding unknown consumptions and/or unknown emissions using similar data nodes in the hierarchical structure(s). Evaluation engine 124 then repeats step 510 to determine if additional unknown data nodes exist in the tree.

Once evaluation engine 124 determines that all unknown data nodes in the tree have been resolved to similar data nodes with known emissions and/or consumptions, evaluation engine 124 performs step 514, in which evaluation engine 124 aggregates emissions associated with the matching data nodes into a result of the query. For example, evaluation engine 124 could combine distributions of emissions, productions, consumptions, and/or other values computed from the matching data nodes into corresponding distributions for the entity represented by the query. Evaluation engine 124 could return the combined distribution(s), representative values in the combined distribution(s) (e.g., means, medians, quantiles, minimums, maximums, etc.), and/or other representations of the combined distributions in the results. Evaluation engine 124 could also, or instead, generate a breakdown of the computed values and/or distributions into corresponding contributions of some or all nodes in the tree.

Finally, in step 516, evaluation engine 124 causes the result to be outputted in a response to the query. For example, evaluation engine 124 could transmit the results to a source of the query. Evaluation engine 124 could also, or instead, output the results in a user interface, file, report, and/or another representation. The results of this query and/or other queries of the database can then be analyzed to determine overall emissions, consumptions, and/or productions associated with the entity; identify "hotspots" that contribute disproportionately to the emissions, consumptions, and/or productions; determine product designs, manufacturing processes, sourcing of materials, policies, regulations, and/or other strategies or actions that reduce negative environmental impacts; conduct simulations and/or studies that assess and/or compare environmental impacts across different processes, products, consumptions, and/or entities; and/or otherwise understand and/or improve the environmental impacts associated with the entities.

In sum, the disclosed techniques process LCA queries using a database that stores LCA data across multiple interconnected planes of a planar data model. The planar data model includes a data plane that stores data nodes representing products, processes, emissions, consumptions, and/or other entities that are used to perform LCA. The data nodes can be organized within one or more trees to represent dependencies and/or relationships between or among the data nodes. The planar data model also includes a separate ontological plane that stores metadata associated with data nodes in the data plane. This metadata includes (but is not limited to) sources, timeframes, locations, classes, and/or attributes associated with data in the data nodes. The ontological plane and data plane are interconnected to allow emissions, consumptions, productions, and/or other quantities associated with the entities to be aggregated, related to one another, compared, and/or otherwise used to evaluate environmental impacts associated with the entities.

An LCA for a given entity can be performed by executing a query that specifies properties of the entity against the database. For example, the query could be used to analyze the environmental impact of a product, process, service, organization, and/or another entity. To process the query, metadata stored in the ontological plane is used to match parameters of the query to data nodes in the data plane. Emissions, consumptions, productions, waste products, and/or other types of environmental impact data associated with the entity can then be computed by traversing paths associated with the matching data nodes in the data plane and aggregating, scaling, and/or otherwise transforming functional units stored in the matching data nodes.

One technical advantage of the disclosed techniques relative to the prior art is the ability to determine environmental impacts associated with the life cycle of an entity without requiring specific inputs, outputs, and/or measurements across the life cycle of the entity to be provided. Consequently, the disclosed techniques can be used to define and execute LCA queries with greater granularity, flexibility, and efficiency than conventional LCA tools that operate using predefined workflows and require certain data points to be specified. Another technical advantage of the disclosed techniques is the ability to automate LCA by processing queries using searches, similarity comparisons, aggregations, and/or computations that leverage a database with a planar data model. These technical advantages provide one or more technological improvements over prior art approaches.

1. In some embodiments, a computer-implemented method for processing a query of a life cycle assessment database comprises searching one or more hierarchical structures included in the life cycle assessment database for a first set of data nodes that match a first set of parameters included in the query, wherein the first set of parameters comprises a set of primary data associated with an entity; computing a first set of emissions associated with the first set of data nodes based on a first set of functional units included in the first set of data nodes; aggregating the first set of emissions into a result of the query; and causing the result to be outputted in a response to the query.

2. The computer-implemented method of clause 1, wherein searching the one or more hierarchical structures comprises matching one or more parameters included in the first set of parameters to a second set of data nodes in the one or more hierarchical structures; and filtering the second set of data nodes based on one or more additional parameters included in the first set of parameters.

3. The computer-implemented method of any of clauses 1-2, wherein the one or more parameters comprise a class associated with the entity and the one or more additional parameters comprise an attribute associated with the class.

4. The computer-implemented method of any of clauses 1-3, further comprising determining that a data node included in the first set of data nodes is associated with an unknown consumption or an unknown emission; searching the one or more hierarchical structures for a second set of data nodes that match a second set of parameters associated with the data node; and generating the result of the query based on a second set of functional units included in the second set of data nodes.

5. The computer-implemented method of any of clauses 1-4, further comprising storing, in memory, a first unknown data node that represents the query and includes the first set of parameters and a second unknown data node that represents the unknown consumption or the unknown emission and includes the second set of parameters.

6. The computer-implemented method of any of clauses 1-5, wherein computing the first set of emissions comprises combining a plurality of distributions of values associated with the first set of functional units into an emission included in the first set of emissions.

7. The computer-implemented method of any of clauses 1-6, wherein computing the first set of emissions comprises computing an emission using a non-linear transformation of one or more functional units included in the first set of functional units.

8. The computer-implemented method of any of clauses 1-7, wherein the first set of emissions is computed based on one or more constraints specified in the query.

9. The computer-implemented method of any of clauses 1-8, wherein the result comprises a breakdown of the first set of emissions into one or more paths that include the first set of data nodes.

10. The computer-implemented method of any of clauses 1-9, wherein the one or more hierarchical structures are included in an ontological plane of the life cycle assessment database and the first set of data nodes is included in a data plane of the life cycle assessment database.

11. In some embodiments, one or more non-transitory computer-readable media storing instructions that, when executed by one or more processors, cause the one or more processors to perform the steps of searching one or more hierarchical structures included in a life cycle assessment database for a first set of data nodes that match a first set of parameters included in a query, wherein the first set of parameters comprises a set of primary data associated with an entity; computing a first set of emissions associated with the first set of data nodes based on a first set of functional units included in the first set of data nodes; aggregating the first set of emissions into a result of the query; and causing the result to be outputted in a response to the query.

12. The one or more non-transitory computer-readable media of clause 11, wherein the instructions further cause the one or more processors to perform the steps of determining that a data node included in the first set of data nodes is associated with an unknown consumption or an unknown emission; searching the one or more hierarchical structures for a second set of data nodes that match a second set of parameters associated with the data node; and generating the result of the query based on a second set of functional units included in the second set of data nodes.

13. The one or more non-transitory computer-readable media of any of clauses 11-12, wherein the second set of parameters includes at least one of a class, a location, a time, and an attribute.

14. The one or more non-transitory computer-readable media of any of clauses 11-13, wherein searching the one or more hierarchical structures comprises determining that a class included in the first set of parameters does not match a second set of data nodes included in the one or more hierarchical structures; determining a parent class of the class using the one or more hierarchical structures; and matching the parent class to the first set of data nodes.

15. The one or more non-transitory computer-readable media of any of clauses 11-14, wherein computing the first set of emissions comprises scaling a first functional unit included in the first set of functional units to match a second functional unit included in the query.

16. The one or more non-transitory computer-readable media of any of clauses 11-15, wherein computing the first set of emissions comprises determining one or more scaling factors between one or more attributes included in the first set of data nodes and a constraint included in the query; and computing the first set of emissions based on the one or more scaling factors and one or more functional units associated with the one or more attributes.

17. The one or more non-transitory computer-readable media of any of clauses 11-16, wherein the one or more hierarchical structures specify consumptions, productions, or emissions associated with the first set of data nodes.

18. The one or more non-transitory computer-readable media of any of clauses 11-17, wherein the one or more hierarchical structures include at least one of an ontology tree of classes representing entities or a set of locations associated with the entities.

19. The one or more non-transitory computer-readable media of any of clauses 11-18, wherein the one or more hierarchical structures comprise one or more sets of secondary life cycle assessment data.

20. In some embodiments, a system comprises one or more memories that store instructions, and one or more processors that are coupled to the one or more memories and, when executing the instructions, are configured to perform the steps of searching one or more hierarchical structures included in a life cycle assessment database for a first set of data nodes that match a first set of parameters included in a query, wherein the first set of parameters comprises a set of primary data associated with an entity; computing a first set of emissions associated with the first set of data nodes based on a set of functional units included in the first set of data nodes; aggregating the first set of emissions into a result of the query; and causing the result to be outputted in a response to the query.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for processing a query of a life cycle assessment database, the method comprising:
    receiving a query comprising a first set of parameters specifying properties of an entity;
    in response to receiving the query, storing, in an in-memory tree structure, a first data node that (i) represents the query and (ii) includes the first set of parameters;
    searching one or more hierarchical structures included in the life cycle assessment database for a first set of data nodes that match the first set of parameters included in the stored first data node;
    after the first set of parameters is matched to the first set of data nodes, storing the first set of data nodes in the in-memory tree structure;
    upon determining that a second data node included in the first set of data nodes includes an unknown consumption or an unknown emission:
        searching the one or more hierarchical structures for a second set of data nodes that (i) match a second set of parameters included in associated with the second data node and (ii) include one or more known emissions corresponding to the unknown emission or one or more known consumptions corresponding to the unknown consumption; and
        resolving the unknown consumption or the unknown emission by computing one or more environmental impacts associated with the entity based on one or aggregations of a set of functional units that (i) correspond to the one or more known emissions or the one or more known consumptions and (ii) are included in at least one of the first set of data nodes or the second set of data nodes; and
    causing the one or more environmental impacts to be outputted in a response to the query.

2. The computer-implemented method of claim 1, wherein:
    the first data node comprises a first unknown data node that represents the query and includes the first set of parameters; and
    the second data node comprises a second unknown data node that (i) includes the second set of parameters and (ii) is a child of the first unknown data node.

3. The computer-implemented method of claim 2, wherein:
    the first set of parameters comprise at least one of a class of the entity or one or more constraints associated with the properties of the entity.

4. The computer-implemented method of claim 1, wherein the properties of the entity comprise at least one of a location, a time, a source, an attribute, a unit, a value associated with the unit, a name, an alias, a process, a consumption, an emission, or a type of node included in the one or more hierarchical structures.

5. The computer-implemented method of claim 1, further comprising:
    determining that a third data node included in the second set of data nodes includes an additional unknown consumption or an additional unknown emission;
    searching the one or more hierarchical structures for a third set of data nodes that match a third set of parameters associated with the second data node; and
    computing the one or more environmental impacts based on a third set of functional units included in the third set of data nodes.

6. The computer-implemented method of claim 1, wherein searching the one or more hierarchical structures for the second set of data nodes comprises:
    matching a class included in the second set of parameters to the second set of data nodes; and
    filtering the second set of data nodes based on one or more additional parameters included in the second set of parameters.

7. The computer-implemented method of claim 6, wherein the one or more additional parameters comprise at least one of an attribute, a time, or a location.

8. The computer-implemented method of claim 1, wherein searching the one or more hierarchical structures for the second set of data nodes comprises:
    upon determining that the second set of parameters do not match any nodes included in the one or more hierarchical structures, searching the one or more hierarchical structures for one or more parent parameters associated with the second set of parameters; and
    matching the one or more parent parameters to the second set of data nodes.

9. The computer-implemented method of claim 1, wherein the one or more environmental impacts comprise at least one of a total emissions, a production, a consumption, or a waste product allocation associated with the entity.

10. The computer-implemented method of claim 1, wherein the set of functional units comprises at least one of a probability distribution or a multi-dimensional functional unit.

11. One or more non-transitory computer-readable media storing instructions that, when executed by one or more processors, cause the one or more processors to perform the steps of:
    receiving a query comprising a first set of parameters specifying properties of an entity;
    in response to receiving the query, storing, in an in-memory tree structure, a first data node that (i) represents the query and (ii) includes the first set of parameters;
    searching one or more hierarchical structures included in a life cycle assessment database for a first set of data nodes that match the first set of parameters included in the stored first data node;
    after the first set of parameters is matched to the first set of data nodes, storing the first set of data nodes in the in-memory tree structure;
    upon determining that a second data node included in the first set of data nodes includes an unknown consumption or an unknown emission:
        searching the one or more hierarchical structures for a second set of data nodes that (i) match a second set of parameters included in the second data node and (ii) include one or more known emissions corresponding to the unknown emission or one or more known consumptions corresponding to the unknown consumption; and
        resolving the unknown emission or the unknown consumption by computing one or more environmental impacts associated with the entity based on one or aggregations of a set of numeric values and a set of corresponding units included in at least one of the first set of data nodes or the second set of data nodes; and
    causing the one or more environmental impacts to be outputted in a response to the query.

12. The one or more non-transitory computer-readable media of claim 11, wherein the instructions further cause the one or more processors to perform the steps of:
    determining that a third data node included in the second set of data nodes is associated with an additional unknown consumption or an additional unknown emission;
    searching the one or more hierarchical structures for a third set of data nodes that match a third set of parameters included in the third data node; and
    computing the one or more environmental impacts based on a second set of numeric values and a second set of corresponding units included in the third set of data nodes.

13. The one or more non-transitory computer-readable media of claim 11, wherein the instructions further cause the one or more processors to perform the steps of:
    matching the second data node to one or more constraints specified in the query; and
    updating the second set of parameters included in the second data node based on the one or more constraints prior to searching the one or more hierarchical structures for the second set of data nodes.

14. The one or more non-transitory computer-readable media of claim 11, wherein searching the one or more hierarchical structures for the first set of data nodes comprises:
    upon determining that no data nodes included in the one or more hierarchical structures match a class included in the first set of parameters or a sub-class of the class, determining a parent class of the class using the one or more hierarchical structures; and
    matching the parent class to the first set of data nodes.

15. The one or more non-transitory computer-readable media of claim 11, wherein searching the one or more hierarchical structures for the second set of data nodes comprises:
    computing a similarity score between the second set of parameters and a third set of parameters associated with a second node in the one or more hierarchical structures; and
    adding the second node to the second set of data nodes based on the similarity score.

16. The one or more non-transitory computer-readable media of claim 15, wherein the similarity score comprises a weighted combination of similarity measures between the second set of parameters and the third set of parameters.

17. The one or more non-transitory computer-readable media of claim 11, wherein searching the one or more hierarchical structures for the second set of data nodes comprises at least one of:
    determining an exact match between one or more parameters included in the second set of parameters and one or more properties of one or more data nodes included in the second set of data nodes;

determining an inexact match between one or more parameters included in the second set of parameters and one or more properties of one or more data nodes included in the second set of data nodes;

determining a semantic match between one or more parameters included in the second set of parameters and one or more properties of one or more data nodes included in the second set of data nodes; or determining a measure of similarity between one or more parameters included in the second set of parameters and one or more properties of one or more data nodes included in the second set of data nodes.

18. The one or more non-transitory computer-readable media of claim 11, wherein searching the one or more hierarchical structures for the second set of data nodes comprises generating one or more clusters of the second set of data nodes based on the second set of parameters.

19. The one or more non-transitory computer-readable media of claim 11, wherein the second set of parameters includes at least one of a class, a location, a time, and an attribute.

20. A system, comprising:
one or more memories that store instructions, and
one or more processors that are coupled to the one or more memories and, when executing the instructions, are configured to perform the steps of:
receiving a query comprising a first set of parameters specifying properties of an entity;
in response to receiving the query, storing, in an in-memory tree structure, a first data node that (i) represents the query and (ii) includes the first set of parameters;
searching one or more hierarchical structures included in a life cycle assessment database for a first set of data nodes that match the first set of parameters included in the stored first data node;

after the first set of parameters is matched to the first set of data nodes, storing the first set of data nodes in the in-memory tree structure;

upon determining that a second data node included in the first set of data nodes includes an unknown consumption or an unknown emission:

searching the one or more hierarchical structures for a second set of data nodes that (i) match a second set of parameters included in the second data node and (ii) include one or more known emissions corresponding to the unknown emission or one or more known consumptions corresponding to the unknown consumption; and resolving the unknown emission or the unknown consumption by computing one or more environmental impacts associated with the entity based on (i) a set of functional units included in at least one of the first set of data nodes or the second set of data nodes and (ii) a set of scaling factors used to scale one or more functional units included in at the set of functional units; and causing the one or more environmental impacts to be outputted in a response to the query.

* * * * *